United States Patent [19]

Crow

[11] 3,750,035

[45] July 31, 1973

[54] FREQUENCY DISCRIMINATOR AND PHASE DETECTOR CIRCUIT

[75] Inventor: Robert Bruce Crow, Sierra Madre, Calif.

[73] Assignee: California Institute of Technology, Pasadena, Calif.

[22] Filed: May 3, 1971

[21] Appl. No.: 139,596

[52] U.S. Cl. .................. 328/133, 307/295, 307/233

[51] Int. Cl. .............................................. H03b 3/04

[58] Field of Search ........................... 328/133, 134; 307/295, 210, 233, 232

[56] References Cited

UNITED STATES PATENTS

| | | | |
|---|---|---|---|
| 3,418,585 | 12/1968 | Harnett | 328/134 |
| 3,475,062 | 10/1969 | Crittenden et al. | 328/133 |
| 3,588,548 | 6/1971 | Williams | 307/295 |
| 3,626,307 | 12/1971 | Koyama | 328/133 |

*Primary Examiner*—John W. Huckert
*Assistant Examiner*—R. E. Hart
*Attorney*—Lindenberg, Freilich & Wasserman

[57] ABSTRACT

Frequency discriminator and phase detector circuits are disclosed, each having two flip-flops, one flip-flop for each of two signals to be compared, and means for causing one flip-flop to be set the majority of the time in proportion to the extent to which one signal differs from the other in frequency or phase, and means for integrating the difference between output waveforms of the flip-flops to obtain an output signal $E_0$ which can be used to adjust the frequency and phase of a variable signal V with respect to a reference signal R.

10 Claims, 10 Drawing Figures

*INVENTOR.*
ROBERT B. CROW

*INVENTOR.*
ROBERT B. CROW

*INVENTOR.*
ROBERT B. CROW

*INVENTOR.*
ROBERT B. CROW

FREQUENCY DISCRIMINATOR AND PHASE DETECTOR CIRCUIT

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

BACKGROUND OF THE INVENTION

This invention relates to frequency discriminators and phase detectors, and more particularly to a circuit for both frequency discrimination and phase detection.

Phase-locked loops are commonly used in communications, and other applications, to assure that a reference signal $f_o$ is generated with the same frequency, and sometimes also of the same phase as an input signal $f_1$. However, most phase detectors are not able to produce an error signal with correct polarity for control of the local oscillator when there is a large difference in frequency between the reference signal and the input signal. Therefore, a separate frequency discriminator has been commonly used to drive the reference signal to the frequency of the input signal. Alternatively, a dual-mode comparator may be provided to first achieve frequency acquisition in one mode, and then drive the reference signal to a phase corresponding with the phase of the input signal in a second mode. In either case, frequency acquisition is often a time consuming task. To overcome this frequency acquisition time, an auxiliary frequency discriminator is sometimes used in combination with a phase detector. The separate error signals are then combined. However, this approach to the problem of frequency acquisition normally complicates the hardware required to implement a phase locked loop.

Although a number of circuits for determining both phase and frequency relationships have thus been proposed, such circuits have been complex and costly. This is primarily because dual-mode circuits must be arranged to transfer from a frequency to a phase comparison mode when the two input frequencies are equal. Such circuits are also complicated by the need for heavy filtering of the error signal. To reduce the amount of required filtering, phase comparators which have been proposed for use in frequency acquisition have required a large number of flip-flops or logic gates. An object of this invention is to provide simplified circuits for the dual functions of frequency discrimination and phase detection without the need for any control logic for converting from frequency acquisition to phase detection.

SUMMARY OF THE INVENTION

In accordance with the invention, two flip-flops are provided, one for each of two signals to be compared for frequency and phase. By causing one of the flip-flops to be set a greater period of time in proportion to the extent to which one signal differs from the other in frequency and phase, and averaging the difference between output waveforms of the flip-flops, the output signal $E_o$ of the integrator will be proportional to the difference in frequency to a saturating limit and with a polarity corresponding to the sign of the difference. The signal may then be used to adjust the frequency of a predetermined one of the two signals to bring it into agreement with the frequency and phase of the other signal. Once per cycle of one input signal, both flip-flops are reset or cleared, and then set at times which bear a relation to the frequency or phase difference of one input signal to the other.

In a basic form of the invention, the two flip-flops are cleared by one input signal at the beginning of each cycle. Then one is set by the other input signal at the beginning of each of its cycles while the other is set by the center (zero-crossover) of each cycle of the same input signal. The averaged difference of complementary outputs of said flip-flops is a signal proportional to phase difference from 0° to 180° with an output of zero at 90°, and a signal proportional to phase difference from 180° to 360° with an output of zero at 270°. This 180° phase ambiguity is eliminated in a second form of the invention by inhibiting the step of clearing both flip-flops until both are in the set state, and setting the separate flip-flops at the beginning of each cycle of the respective input signals. The difference between corresponding true output terminals of the flip-flops is averaged as before.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
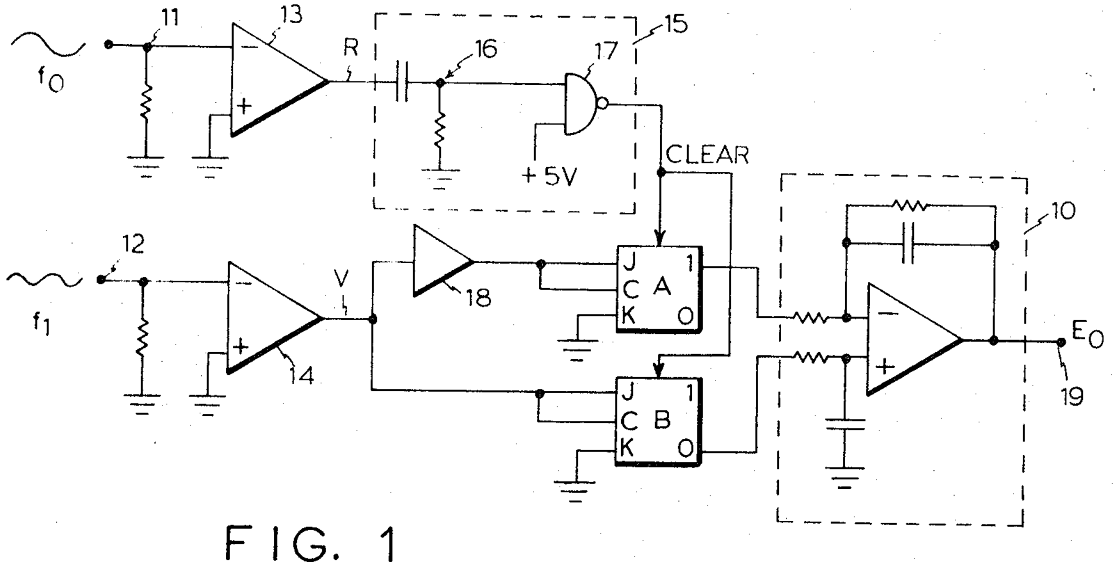
FIG. 1 is a diagram of a first embodiment of the invention.

Referring now to the drawings, a first embodiment is comprised of two flip-flops A and B and means 10 for averaging the difference between complementary (Q and $\bar{Q}$) output signals of the flip-flops to produce a signal $E_o$ proportional to the difference in frequency and phase between two a-c signals at input terminals 11 and 12. High-gain differential amplifiers 13 and 14 have their noninverting (+) input terminals connected to circuit ground in order to produce at respective output terminals the square waveforms R and V shown in FIG. 2.

Figure 2:
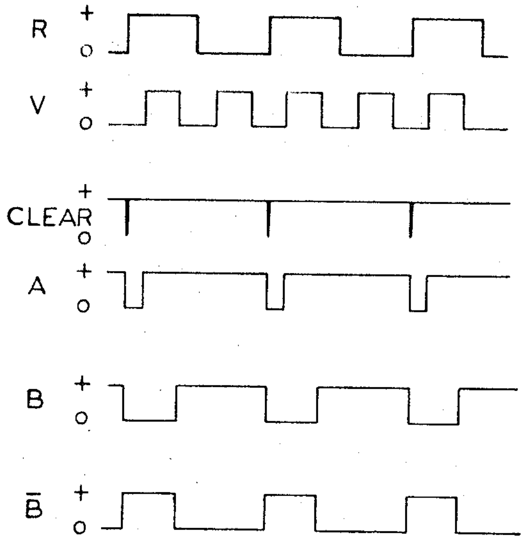
FIG. 2 is a waveform diagram illustrating one case of frequency discrimination using the embodiment of FIG. 1.

The waveform R, at a frequency $f_o$ less than the frequency $f_1$ in the example of FIG. 2, is differentiated by a circuit 15 to obtain sharp negative pulses to clear the flip-flops at the beginning of each cycle. An RC circuit 16 differentiates the square waveform R to obtain sharp positive and negative pulses in a conventional manner. A NAND gate 17 inverts the positive pulses and suppresses the negative pulses to produce the waveform labeled CLEAR in FIG. 2. However, this arrangement is for the use of J-K flip-flops requiring a pulse which momentarily goes to zero to clear. It should be appreciated that other arrangements may be provided; all that is required is means responsive to the input signal at terminal 11 to reset the flip-flops A and B at the beginning of each cycle.

The square waveform V is connected to the J and clock (C) input terminals of the flip-flop A by an inverter 18 and directly to corresponding input terminals of the flip-flop B. The K input terminal of each flip-flop is connected to circuit ground. This arrangement is for setting the flip-flop A at the beginning of each cycle of the waveform V and for setting the flip-flop B a half cycle later of the waveform V. Other arrangements could be provided; all that is required is means for setting the flip-flop A at the beginning and the flip-flop B a half cycle later of the waveform V, provided that such means is dominated by the means for clearing the flip-flops.

Figure 3:
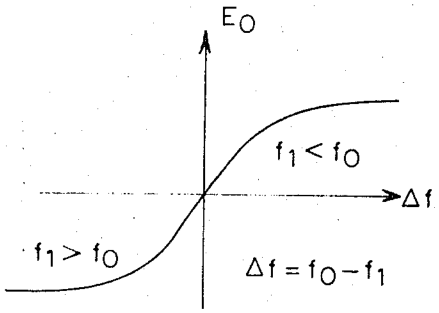
FIG. 3 is a graph illustrating the output voltage of the embodiment of FIG. 1 as a function of the frequency difference.

In operation, the flip-flop A will be reset a majority of the time if the frequency $f_o$ of the waveform R is greater than the frequency $f_1$ of the waveform V, and vice versa if the frequency $f_1$ is greater than the frequency $f_o$. The latter situation is illustrated in FIG. 2. Both flip-flops are cleared at the beginning of each cycle of the waveform R. The waveform V then sets the flip-flop A at the beginning of the next cycle. At the middle, i.e., at the next negative-going zero-crossover of the signal on the terminal 12, the flip-flop B is set. Upon averaging the difference between waveforms A and $\overline{B}$, where $\overline{B}$ is the complement of the waveform B, a negative signal $E_o$ is produced at an output terminal 20 of the differential averaging integrator 10. This indicates that the input signal frequency $f_1$ is greater than the reference signal frequency $f_o$. When the frequency $f_1$ is less than the frequency $f_o$, the signal $E_o$ is positive. The amplitude of the signal $E_o$ is approximately proportional to the difference in frequency until one frequency differs from the other by a factor of about 10 when the differential integrator approaches saturation as shown in FIG. 3.

If the output signal $E_o$ is used to adjust the frequency $f_o$ until it equals $f_1$, the amplitude of the output signal $E_o$ will decrease as the frequency $f_o$ approaches $f_1$. Should the adjusting apparatus (not shown) overshoot, the output signal $E_o$ will reverse in polarity to control frequency adjustment in the opposite direction. This is so because both flip-flops will be cleared at the beginning of each cycle of the higher frequency waveform and thereafter the flip-flop A is set at the beginning of the cycle of waveform V before the flip-flop B is set at the middle of the cycle of the waveform V. Each flip-flop is cleared at the beginning of the next cycle of the high frequency waveform R. Upon averaging the difference between the waveforms $\overline{B}$ and A, a positive output signal $E_o$ is produced.

Figure 4:
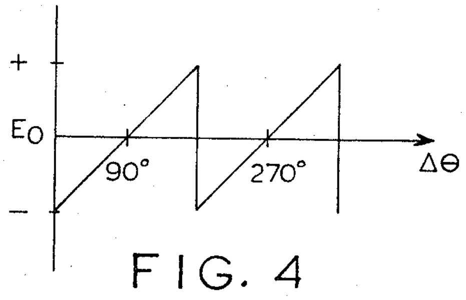
FIG. 4 is a graph illustrating the output voltage of the embodiment of FIG. 1 for operation in the phase detection mode.
Figure 5:
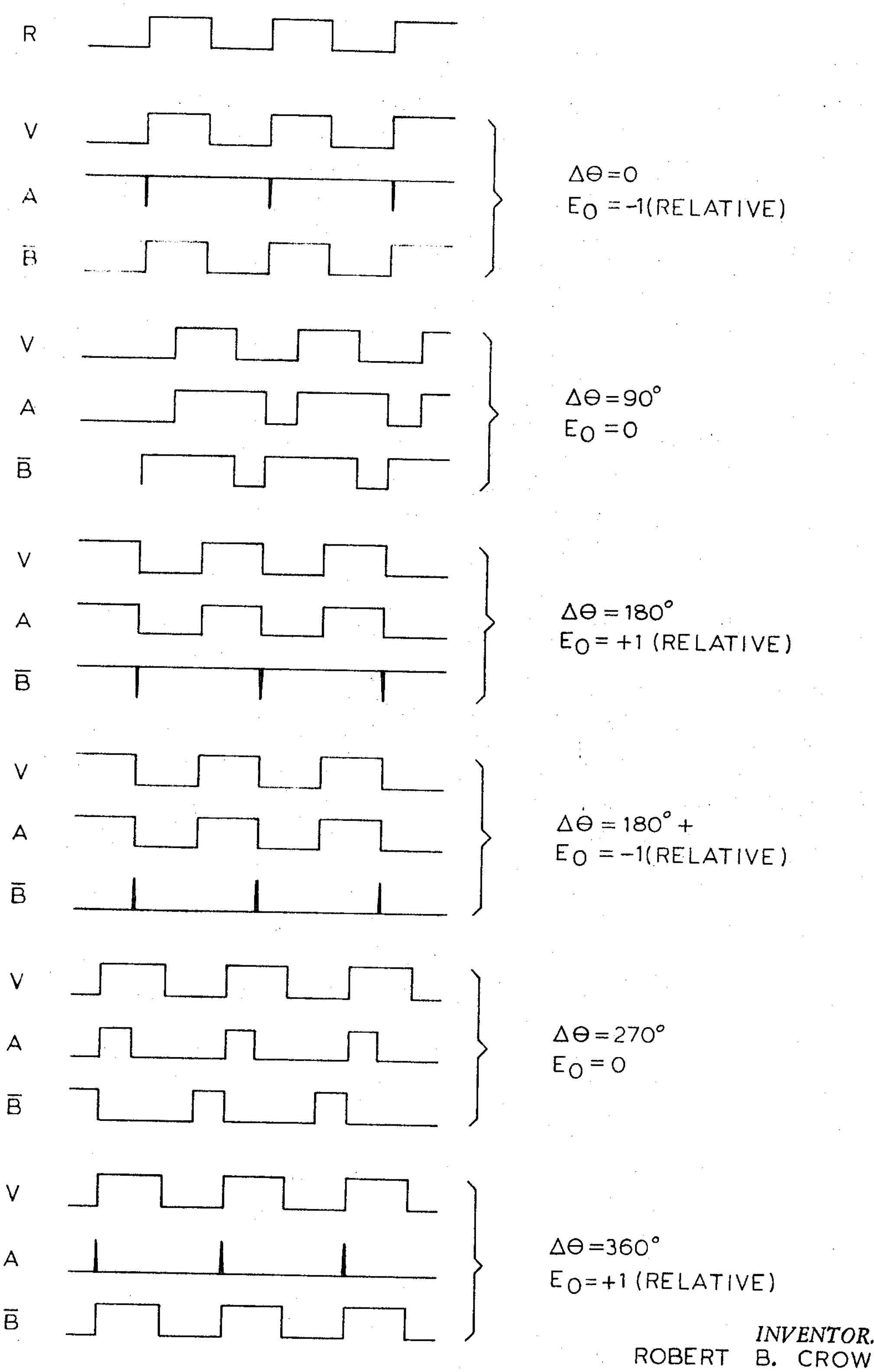
FIG. 5 shows four sets of waveform diagrams illustrating four cases of phase detection using the embodiment of FIG. 1.

Once the two waveforms R and V are of the same frequency, the output $E_o$ is reduced to zero if the phase difference $\Delta\Theta$ of the waveforms R and V is 90° or 270°. Otherwise the polarity and relative amplitude of the output signal $E_o$ is as shown in FIG. 4. If it is desired to have the phase difference driven to 0° or 180°, a 90° phase shifter may be employed at the input terminal 11, thus rendering the actual phase difference of the signals R and V equal to zero while the apparent difference in the phase detector is 90°. However, in either case there is a 180° phase ambiguity, as shown by FIG. 4 and illustrated by the waveform diagrams in FIG. 5. Accordingly, for applications which require phase detection without ambiguity, i.e., if absolute phase lock is important, it is necessary to effectively cause clearing of the flip-flops once every two cycles of the input as opposed to once every cycle in the waveform diagrams of FIG. 5. That could be accomplished by a third flip-flop to divide the clear pulses by two, but dividing by two will reduce the phase detection gain by ½. Accordingly, the arrangement of FIG. 6 is preferred.

Figure 6:
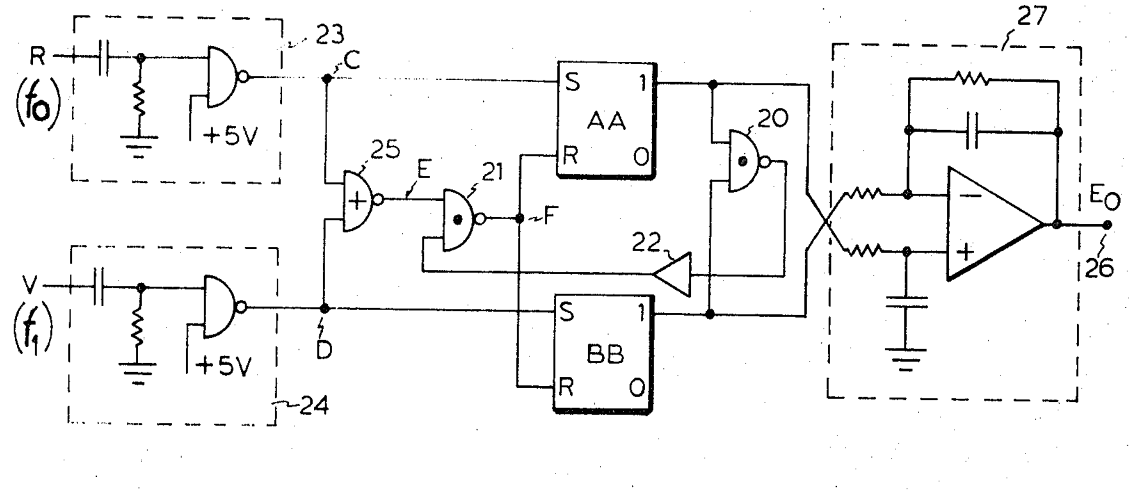
FIG. 6 is a diagram of a second embodiment of the invention.

Referring now to FIG. 6, where the flip-flops are identified by the double reference letters AA and BB, the true output signals are connected to a NAND gate 20 to enable a NAND gate 21 via inverter 22. This allows each of the flip-flops to be cleared (reset) only every other cycle of the highest frequency signal during the frequency acquisition mode, and every cycle of the two signals during the phase acquisition mode.

Figure 8:
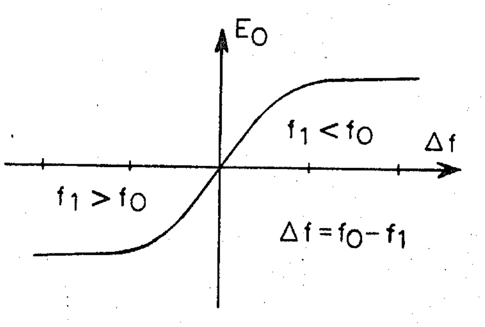
FIG. 8 is a graph illustrating the output voltage of the embodiment of FIG. 5 as a function of frequency difference.
Figure 7:
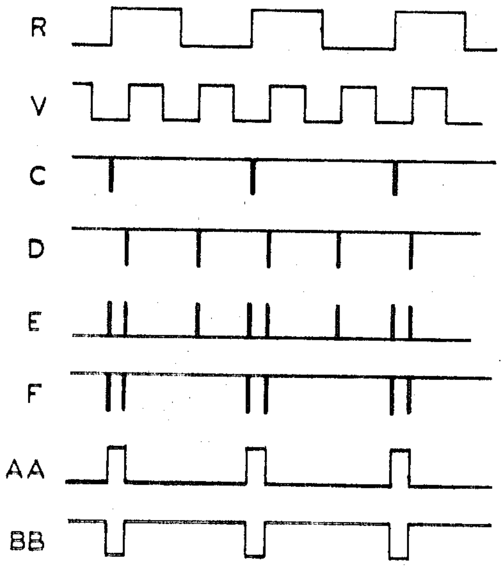
FIG. 7 is a waveform diagram illustrating one case of frequency discrimination using the embodiment of FIG. 6.

Two circuits 23 and 24 differentiate the square waveforms R and V shown in FIG. 7 to provide negative-going pulses at points C and D. The pulses are relatively wide (on the order of 100 nanoseconds) as shown in FIG. 7 in the waveforms identified by the corresponding letters C and D. A NAND gate 25 provides an OR function for the pulses of waveforms C and D when combined with the AND function of the NAND gate 21. Accordingly, the Boolean logic for resetting the flip-flops is as follows:

$$F = (C+D)\ (AA \cdot BB)$$

where F is the reset or clear signal shown in waveform F of FIG. 7. The result of this logic for the situation shown in FIG. 7 of the frequency $f_1$ of the waveform V greater than the frequency $f_o$ of the waveform R is the waveform BB which is positive a majority of the time, as compared to the waveform AA. In that manner, the integrated difference $E_o$ is a negative signal as shown in FIG. 8 just as for the embodiment of FIG. 1. When the frequency $f_1$ of the waveform V is less than the frequency $f_o$ of the reference waveform R, the signal $E_o$ at the output 26 of a differential averaging integrator 27 is positive, as shown by the graph of FIG. 8.

Figure 9:
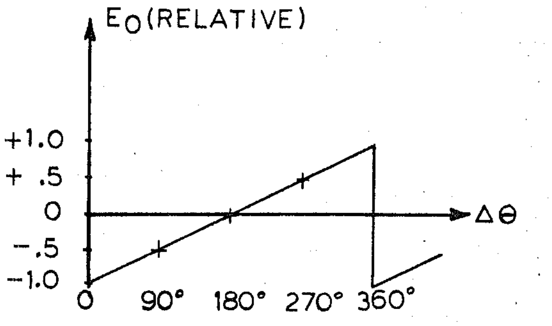
FIG. 9 is a graph illustrating the output voltage of the embodiment of FIG. 6 for operation in the phase detection mode.

When the frequencies are equal, the output signal $E_o$ is zero only if they are 180° out of phse, as shown in FIG. 9. Otherwise, the output signal $E_o$ will be positive for phase difference between 180° and 360° and negative for phase difference between 0° and 180°. Thus there is no ambiguity in the phase detection output.

In operation, the pulses of the waveforms C and D of FIG. 7 are produced at corresponding points in the circuit of FIG. 6 to set the respective flip-flops AA and BB. Both waveforms C and D are combined by the NAND gate 25 to produce the waveform E. Of the combined pulses of the waveform E, the ones which occur while the second of the two flip-flops is being set will be transmitted through the gate 21 as a reset pulse. This transmitted pulse will reset only the previously set flip-flop, not the one being set, due to the regenerative feedback within the flip-flop being set which continues to enable the NAND gate 20. In that manner the flip-flop that is just being set will end up in the set condition, while the other which was previously set will be reset. The result is that the flip-flop BB is set for a greater period of time than the flip-flop AA when the frequency $f_1$ is greater than the frequency $f_o$.

Upon averaging the difference (AA-BB) between the waveforms AA and BB, an output signal $E_o$ is produced at terminal 26 which is negative indicating that the frequency $f_1$ of the variable signal V is greater than the frequency $f_o$ of the reference signal R, as just noted hereinbefore. If the frequency $f_o$ is greater than the frequency $f_1$, the roles of the flip-flops are reversed, and the output signal $E_o$ is positive. FIG. 8 illustrates in a graph the output signal $E_o$ as a function of the difference in frequency which can be used to make the frequency of the reference signal R equal to the frequency of the variable signal V.

Once the frequency $f_1$ is equal to the frequency $f_o$, the frequency discriminator circuit of FIG. 6 functions as a phase detector to produce an output signal $E_o$ as a function of phase difference ($\Delta\Theta$) without ambiguity as shown in FIG. 9. That output signal may be used to change the frequency of the controlled signal as though there were a difference in frequency. That results in shifting the phase of the controlled signal until the phase difference is 180°. If a phase difference of zero degrees is desired, a 180° phase shifter may be employed at the input of one of the differentiating networks 23 and 24, thus rendering the actual phase difference between the signals R and V zero when the output signal $E_o$ indicates a phase difference of 180°.

Figure 10:
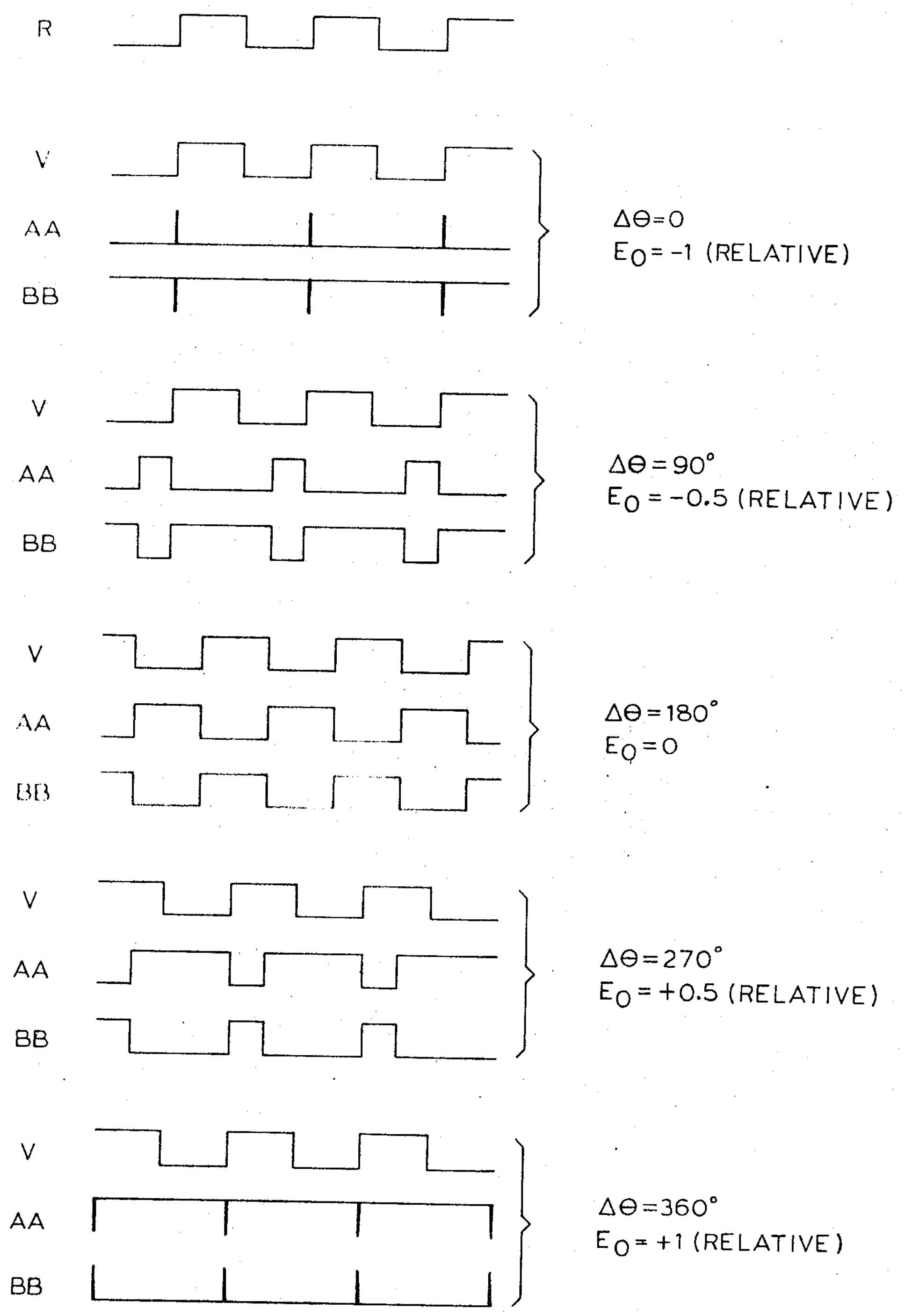
FIG. 10 shows four sets of waveform diagrams illustrating four cases of phase detection using the embodiment of FIG. 6.

Operation of the circuit of FIG. 6 for phase detection is very much like operation for frequency discrimination as may be seen from four sets of45 waveform diagrams in FIG. 10 showing the relationship of the waveforms AA and BB to the phase difference between the waveforms R and V. When the phase difference is zero, flip-flop AA is set and flip-flop BB is reset at the beginning of each cycle and immediately thereafter flip-flop AA is reset and flip-flop BB is set simultaneously so that the output signal $E_o$ is negative. At all other times, the flip-flop AA is set at the beginning of each cycle of the waveform R and reset immediately after the flip-flop BB is set at the beginning of each cycle of the waveform V. Upon integrating the difference between the waveforms AA and BB, an output signal $E_o$ is produced for the cases of phase difference of 90°, 180° and 270° at relative amplitudes of −0.5, 0 and +0.5 of the maximum reached as the phase difference approaches 360°, as shown in FIG. 9. If the phase difference were to be further increased, there would be a transition to a signal at relative amplitude of −1 indicating a phase difference of zero degrees, thus eliminating any ambiguity.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. Apparatus for comparing the frequency and phase of a first a-c signal with the frequency and phase of a second a-c signal comprising:

first and second flip-flops, means for averaging the difference between first and second output waveforms of said respective first and second flip-flops to produce a d-c signal proportional to said difference with a polarity corresponding to the sign of said difference, where the amplitude and polarity is the same for both waveforms; and means responsive to said first and second a-c signals for setting and resetting said first and second flip-flops continuously in a cyclic pattern and for causing one of said first and second flip-flops to be in a set state a greater period of time out of each cycle of one of said first and second signals in proportion to the extent to which one of said first and second signals differs from the other in frequency and phase wherein which of said first and second flip-flops will be set a greater period of time out of each cycle of one of said first and second signals depends upon the relationship between said first and second signals in frequency and phase.

2. Apparatus as defined in claim 1 wherein said last named means comprises:

means for resetting said first and second flip-flops in response to the beginning of each cycle of said first signal; and means for setting said first and second flip-flops in response to the beginning and center of each cycle of said second signal, respectively, following each resetting operation by said resetting means in response to said first signal.

3. Apparatus as defined in claim 2 wherein said resetting means comprises:

a reset control means in each of said first and second flip-flops responsive to pulses of a given voltage characteristic; and means responsive to said first signal for producing a pulse of said given voltage characteristic in synchronism with the zero-crossover time of said first signal in a predetermined direction from a given polarity.

4. Apparatus as defined in claim 3 wherein said setting means comprises:

a set control means in each of said first and second flip-flops responsive to the leading edge of pulses of a given voltage characteristic;

means responsive to said second signal for producing a squarewave signal of the same frequency and phase of said second signal and a complementary squarewave signal;

means for applying said squarewave signal directly to said set control means of said second flip-flop, and means for applying said complementary squarewave signal to said set control means of said first flip-flop.

5. Apparatus as defined in claim 4 wherein said averaging means is connected to said first and second flip-flops to average the difference between the true output signal of said first flip-flop and the complementary output signal of said second flip-flop.

6. Apparatus as defined in claim 1 wherein said last named means comprises:

set control means in said first flip-flop responsive to pulses of a given voltage characteristic for setting said first flip-flop, set control means in said second flip-flop responsive to pulses of said given voltage characteristic for setting said second flip-flop, reset control means in said first flip-flop responsive to pulses of said given voltage characteristic to reset said first flip-flop except when action has already been started to set said first flip-flop by a pulse in said set control means thereof;

reset control means in said second flip-flop responsive to pulses of said given voltage characteristic to reset said second flip-flop except when action has already been started to set said second flip-flop by a pulse in said set control means thereof, means responsive to said first a-c signal for producing a first train of pulses of said given voltage characteristic, one pulse at the beginning of each cycle of said first a-c signal;

means responsive to said second a-c signal for producing a second train of pulses of said given voltage characteristic, one pulse at the beginning of each cycle of said second a-c signal;

means directly coupling said first and second trains to respective set control means of said first and second flip-flops;

means responsive to corresponding output terminals of said first and second flip-flops for producing a reset control pulse of said given voltage characteristic when one of said first and second flip-flops is set in response to a pulse from one of said first and second trains of pulses after the other flip-flop has already been set; and means for applying said reset control pulse to said reset control means of both of said first and second flip-flops to immediately reset the flip-flop previously set while allowing the flip-flop that has just been set to remain set.

7. Apparatus as defined in claim 6 wherein said means for producing said reset control pulse comprises:

a first gating means connected to said first and second flip-flops for producing a reset enable signal when both of said first and second flip-flops are set;

a second gating means connected to said means for producing said first train of pulses and to said means for producing said second train of pulses for combining said first and second trains into a third train of pulses; and a third gating means for transmitting a pulse of said third train to said reset control means of said first and second flip-flops in response to said reset enable signal.

8. Apparatus for comparing the frequency and phase of a first a-c signal with the frequency and phase of a second a-c signal comprising:

a first flip-flop having a reset control means for resetting said first flip-flop in response to pulses of a given polarity and a set control means for setting said first flip-flop in response to the leading edge of pulses of said given polarity;

a second flip-flop having a reset control means for resetting said second flip-flop in response to pulses of a given polarity and a set control means for setting said second flip-flop in response to the leading edge of pulses of said given polarity; first and second means for producing respective first and second rectangular waveforms from said first and second a-c signals;

means responsive to said first rectangular waveform for producing sharp pulses of said given polarity at the beginning of each cycle of said first rectangular waveform;

means for applying said second rectangular waveform to said set control means of said second flip-flop;

inverting means for applying the complement of said second rectangular waveform to said set control means of said first flip-flop; and means for averaging the difference between first and second output waveforms of said respective first and second flip-flops to produce a d-c signal proportional to said difference.

9. Apparatus as defined in claim 8 where said first output waveform is the true output waveform of said first flip-flop and said second output waveform is the complementary output waveform of said second flip-flop.

10. Apparatus for comparing the frequency and phase of a first a-c signal with the frequency and phase of a second a-c signal comprising:

a first flip-flop having a reset control means for being reset in response to pulses of a given polarity and a set control means for being set in response to pulses of said given polarity;

a second flip-flop having a reset control means for being reset in response to pulses of a given polarity and a set control means for being set in response to pulses of said given polarity;

first and second means for producing respective first and second trains of pulses from said first and second a-c signals, said pulses marking the beginning of cycles said respective first and second a-c signals, where said beginning is selected to be a zero-crossover of said respective first and second a-c signals from a given polarity to the opposite polarity;

means for applying said first and second trains of pulses to respective set control means of said first and second flip-flops;

means for combining said first and second train of pulses to form a third train of pulses having a pulse in time coincidence with each pulse of both said first and said second trains;

means for gating a pulse from said third train of pulses to said reset control means of both of said first and second flip-flops immediately upon both of said first and second flip-flops being set, said pulse thus gated being in time coincidence with a pulse in one of said first and second trains of pulses, which pulse causes the setting of the last of said first and second flip-flops to be set; and means for averaging the difference between first and second output waveforms of said respective first and second flip-flops to produce a d-c signal proportional to said difference.

* * * * *